(12) United States Patent
Niwa

(10) Patent No.: US 11,433,525 B2
(45) Date of Patent: Sep. 6, 2022

(54) ELECTRIC WORKING MACHINE AND METHOD OF ASSEMBLING ELECTRIC WORKING MACHINE

(71) Applicant: MAKITA CORPORATION, Anjo (JP)

(72) Inventor: Akira Niwa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 568 days.

(21) Appl. No.: 16/574,131

(22) Filed: Sep. 18, 2019

(65) Prior Publication Data
US 2020/0101587 A1    Apr. 2, 2020

(30) Foreign Application Priority Data
Sep. 28, 2018    (JP) .............................. JP2018-185390

(51) Int. Cl.
| | |
|---|---|
| *B25F 5/02* | (2006.01) |
| *H02K 11/215* | (2016.01) |
| *H02K 11/30* | (2016.01) |
| *F21V 33/00* | (2006.01) |
| *H01B 7/00* | (2006.01) |

(Continued)

(52) U.S. Cl.
CPC ............ *B25F 5/02* (2013.01); *F21V 33/0084* (2013.01); *H01B 7/0045* (2013.01); *H02K 3/522* (2013.01); *H02K 5/08* (2013.01); *H02K 7/145* (2013.01); *H02K 11/0094* (2013.01); *H02K 11/215* (2016.01); *H02K 11/30* (2016.01); *H02K 21/16* (2013.01); *B25B 21/02* (2013.01);
(Continued)

(58) Field of Classification Search
CPC ........ B25B 21/02; B25F 5/02; F21V 33/0084; F21Y 2115/10; H02K 11/0094; H02K 11/215; H02K 11/30; H02K 21/16; H02K 2203/09; H02K 2211/03; H02K 3/522; H02K 5/08; H02K 7/145
USPC ...................... 173/217; 310/51, 71, 75 R, 89
See application file for complete search history.

(56) References Cited

U.S. PATENT DOCUMENTS

| | | | |
|---|---|---|---|
| 4,678,864 A | 7/1987 | Cox | |
| 11,205,820 B2 * | 12/2021 | Hanawa | .............. H01M 50/296 |

(Continued)

FOREIGN PATENT DOCUMENTS

| | | |
|---|---|---|
| EP | 1780844 A1 | 5/2007 |
| JP | 2012-157932 A | 8/2012 |

(Continued)

OTHER PUBLICATIONS

Feb. 22, 2022 Office Action issued in Japanese Patent Application No. 2018-185390.

(Continued)

*Primary Examiner* — Rashad H Johnson
(74) *Attorney, Agent, or Firm* — Oliff PLC

(57) ABSTRACT

In one aspect of the present disclosure, an electric working machine includes an integrally-molded member, a first conductor, and a second conductor. The integrally-molded member includes a surface and contains an insulation material. The first conductor is integrally provided to the surface of the integrally-molded member and supplies a first current. The second conductor is integrally provided to the integrally-molded member and supplies a second current. A portion of the second conductor is embedded into the integrally-molded member.

18 Claims, 13 Drawing Sheets

(51) Int. Cl.
  *H02K 3/52* (2006.01)
  *H02K 5/08* (2006.01)
  *H02K 7/14* (2006.01)
  *H02K 11/00* (2016.01)
  *H02K 21/16* (2006.01)
  *F21Y 115/10* (2016.01)
  *B25B 21/02* (2006.01)

(52) U.S. Cl.
  CPC ....... *F21Y 2115/10* (2016.08); *H02K 2203/09* (2013.01); *H02K 2211/03* (2013.01)

(56) References Cited

U.S. PATENT DOCUMENTS

| | | | |
|---|---|---|---|
| 2010/0102683 A1* | 4/2010 | Utsumi | H02K 11/046 310/68 D |
| 2010/0116570 A1* | 5/2010 | Sugawara | B60L 58/16 429/82 |
| 2011/0063817 A1 | 3/2011 | Kynast et al. | |
| 2011/0175496 A1* | 7/2011 | Shirakata | H02K 11/048 310/68 R |
| 2012/0292070 A1* | 11/2012 | Ito | H02K 11/33 173/217 |
| 2013/0255981 A1* | 10/2013 | Noto | B25F 5/00 173/217 |
| 2013/0334906 A1* | 12/2013 | Sonoda | B62D 5/0406 310/43 |
| 2014/0148026 A1* | 5/2014 | Nomura | E02F 9/2075 439/188 |
| 2014/0375180 A1* | 12/2014 | Suzuki | H02K 11/05 310/68 D |
| 2015/0022125 A1* | 1/2015 | Takano | H02P 29/68 318/139 |
| 2015/0280532 A1* | 10/2015 | Mizutani | B25F 5/00 310/50 |
| 2017/0151657 A1* | 6/2017 | Nagasaka | H02K 7/145 |
| 2017/0214292 A1* | 7/2017 | Nagahama | H02K 1/12 |
| 2017/0246735 A1* | 8/2017 | Hashimoto | B25D 11/04 |
| 2017/0305456 A1* | 10/2017 | Iwabuki | B62D 5/04 |
| 2017/0312902 A1* | 11/2017 | Noguchi | B25D 17/24 |
| 2017/0334054 A1 | 11/2017 | Kamiya et al. | |
| 2018/0009098 A1* | 1/2018 | Nagasaka | B25F 5/026 |
| 2018/0337575 A1* | 11/2018 | Sengiku | H01R 13/516 |
| 2019/0006909 A1* | 1/2019 | Nagahama | B25D 17/00 |
| 2019/0168371 A1* | 6/2019 | Aoki | B23D 51/01 |
| 2019/0260209 A1* | 8/2019 | Nishikawa | H01M 50/502 |
| 2019/0372432 A1* | 12/2019 | Kajihara | H02K 7/116 |
| 2020/0101587 A1* | 4/2020 | Niwa | F21V 33/0084 |
| 2020/0119600 A1* | 4/2020 | Inuzuka | H02K 3/34 |
| 2020/0195076 A1* | 6/2020 | Naito | H02K 3/50 |
| 2021/0083543 A1* | 3/2021 | Watanabe | H02K 5/08 |
| 2021/0091640 A1* | 3/2021 | Aoyama | B25F 5/00 |
| 2021/0175780 A1* | 6/2021 | Sano | H02K 5/1735 |
| 2021/0222866 A1* | 7/2021 | Niwa | F21V 33/008 |
| 2021/0296955 A1* | 9/2021 | Yamada | H02K 3/28 |
| 2021/0362289 A1* | 11/2021 | Nakayama | B25F 5/00 |
| 2021/0367473 A1* | 11/2021 | Yoshimura | H02K 3/12 |
| 2022/0006362 A1* | 1/2022 | Fujii | H02K 11/21 |
| 2022/0085698 A1* | 3/2022 | Niwa | B25F 5/00 |
| 2022/0094251 A1* | 3/2022 | Niwa | H02K 29/08 |

FOREIGN PATENT DOCUMENTS

| | | |
|---|---|---|
| JP | 5117244 B2 | 1/2013 |
| JP | 2017-205834 A | 11/2017 |
| JP | 2018-098076 A | 6/2018 |

OTHER PUBLICATIONS

Mar. 11, 2020 Search Report issued in European Patent Application No. 19198181.0.

* cited by examiner

ELECTRIC WORKING MACHINE AND METHOD OF ASSEMBLING ELECTRIC WORKING MACHINE

CROSS-REFERENCE TO RELATED APPLICATIONS

This application claims the benefit of Japanese Patent Application No. 2018-185390 filed on Sep. 28, 2018 with the Japan Patent Office, the entire disclosure of which is incorporated herein by reference.

BACKGROUND

The present disclosure relates to an electric working machine.

A power tool disclosed in Japanese Patent No. 5117244 includes a light emitting diode (LED), which is coupled to a controller via a lead wire. As exemplified in this power tool, a power tool is generally configured such that a lead wire is used for an electrical wiring laid in the power tool.

SUMMARY

Using the lead wire for various electric wirings may result in complicated work in laying an electric wiring and cause a working hour to increase.

In one aspect of the present disclosure, it is preferable to be able to enhance working efficiency in laying an electrical wiring in an electric working machine.

An electric working machine according to one aspect of the present disclosure includes an integrally-molded member, a first conductor and/or a second conductor. The integrally-molded member includes a surface. The integrally-molded member contains an insulation material. The first conductor is integrally provided to the surface of the integrally-molded member. The first conductor supplies a first current (first conductor current). The second conductor is integrally provided to the integrally-molded member. More specifically, a portion of the second conductor is embedded into the integrally-molded member. The second conductor supplies a second current (second conductor current).

According to the electric working machine configured as above, the first conductor and the second conductor each are integrally provided to the integrally-molded member. As a result, placing the integrally-molded member in the electric working machine enables both the first conductor and the second conductor to maintain a proper positional relationship and, at the same time, to be easily placed. Accordingly, it is possible to enhance working efficiency in laying an electric wiring in the electric working machine.

The insulation material may be any material that has insulating performance. The insulation material may contain, for example, resin or may not contain resin. The resin may be, for example, thermoplastic resin or a thermosetting resin. The insulation material may contain, for example, glass or may not contain glass. The insulation material may contain, for example, rubber or may not contain rubber.

The integrally-molded member may be molded in any manner. The integrally-molded member may be integrally molded, for example, by injection molding or low temperature and pressure molding. The injection molding is a molding method in which, for example, an insulation material having liquidity is injected into a mold and is then cured therein, to thereby integrally mold the insulation material.

The second conductor may include an elongated portion, a first terminal, and/or a second terminal. The elongated portion may include a first end and a second end. The first terminal may be situated in the first end. The second terminal may be situated in the second end. The first terminal and the second terminal may be exposed outside the integrally-molded member. A portion of the elongated portion is embedded into the integrally-molded member.

The second current may have a maximum value that is larger than a maximum value of the first current. According to the electric working machine configured as above, the integrally-molded member has a portion of the second conductor embedded therein, the second conductor carrying the second current that is relatively larger in the maximum value. Specifically, the portion of the second conductor is present within the integrally-molded member and is not exposed outside the integrally-molded member. As a result, it is possible to properly maintain insulating performance of the second conductor.

The electric working machine may further include an actuator. The actuator may be electrically coupled to the second conductor. The actuator may be driven by the second current supplied from the second conductor.

In general, the actuator is driven by a large amount of electric current. The electric current for driving the actuator is supplied to the actuator via the second conductor, so that it is possible to lay the electric wiring to the actuator in a manner to properly maintain insulating performance with efficiency at the same time.

The actuator may include a motor. The motor may be a blushless motor.

The electric working machine may further include a rotation position detector that is configured to output a signal in accordance with a rotational position of the motor. The first conductor may be electrically coupled to the rotation position detector. The first conductor may supply the first current from the first conductor to the rotation position detector. The first conductor may supply the first current from the rotation position detector to the first conductor, the first current corresponding to the signal.

According to the electric working machine configured as above, it is possible to efficiently supply the first current to the rotation position detector via the first conductor or supply the first current from the rotation position detector to the inside of the electric working machine via the first conductor.

The actuator may include an input terminal that is configured to be supplied with the second current. The second conductor may include an output terminal that is configured to output the second current. The output terminal may be in contact with the input terminal.

According to the electric working machine configured as above, it is possible to electrically couple the actuator and the second conductor together with ease.

The integrally-molded member may include a groove, into which the input terminal is inserted. The output terminal may face the input terminal that is inserted into the groove.

The output terminal may include a first screw hole (output terminal screw hole). The input terminal may include a second screw hole (input terminal screw hole). The electric working machine may include screws. The respective screws may be screwed into the first screw hole and the second screw hole. The output terminal and the input terminal may be mechanically and electrically coupled together by screwing the respective screws into the first screw hole and the second screw hole.

The electric working machine may further include a light emitting diode (LED) that is configured to be driven by the first current. The first conductor may be electrically coupled to the LED. The first conductor may supply the first current from the first conductor to the LED.

According to the electric working machine configured as above, it is possible to efficiently supply the first current to the LED via the first conductor.

The electric working machine may further include a low temperature and pressure molded member (a member that is formed by low temperature and pressure molding) that is provided to the surface of the integrally-molded member. The low temperature and pressure molded member may be formed to cover at least a portion of the first conductor. The low temperature and pressure molded member may contain an insulation material.

According to the electric working machine configured as above, the first conductor, which is provided to the surface of the integrally-molded member, is not entirely exposed outside the integrally-molded member; and the at least the portion of the first conductor is covered with the low temperature and pressure molded member to be insulated. Moreover, the low temperature and pressure molded member is formed by the low temperature and pressure molding. As a result, it is possible to enhance insulating performance of the first conductor with ease and efficiency.

The electric working machine may further include a handle that is gripped by a user of the electric working machine. The handle may include an internal hollow. The internal hollow is an internal space in the handle. The integrally-molded member may be situated in the internal hollow.

In general, the handle is often configured to be narrow so that the user can properly grip the handle with the user's hand. For this reason, the internal hollow is narrower than other spaces present within the electric working machine; and laying the electric wiring in the internal hollow is highly likely to be difficult in comparison with laying the electric wiring in other spaces. The first conductor and the second conductor, each of which is integral with the integrally-molded member, are used for the electric wiring in such a narrow internal hollow, to thereby enable the electric wiring to be laid into the internal hollow with efficiency.

The actuator may include a motor. The electric working machine may further include a rotation direction selector that is configured to be operated by a user of the electric working machine. A rotation direction of the motor may be selected in response to operation of the rotation direction selector. The integrally-molded member may include a selector insertion hole, into which the rotation direction selector is inserted. The rotation direction selector may move through the selector insertion hole in response to the operation of the rotation direction selector by the user.

The integrally-molded member may include a first frame that is formed into a plate shape and includes a plate surface. The integrally-molded member may include a second frame that extends from the plate surface so as to intersect the plate surface. The second frame may extend in a manner to be perpendicular or approximately perpendicular to the plate surface.

The first frame may include a first surface (first frame surface). The second frame may include a second surface (second frame surface). The first conductor may be provided to the first surface and the second surface. The second conductor is not provided to the second frame, but may be provided to the first frame.

The first frame may include a first edge (first frame edge). The second frame may include a second edge (second frame edge). The integrally-molded member may further include a third frame that is formed into a plate shape and extends from the plate surface so as to intersect the plate surface. The third frame may extend from the first edge and the second edge. The third frame may extend from the plate surface in a manner to be perpendicular or approximately perpendicular to the plate surface.

The electric working machine may further include a trigger, a trigger switch, and/or a switch box. The trigger may be operated by a user of the electric working machine. In response to operation of the trigger, the actuator may be driven. The trigger switch may be switched ON or OFF in response to the operation of the trigger. The switch box may house the trigger switch therein. The switch box is situated in an area that is surrounded by the first frame, the second frame, and the third frame. The switch box may be placed to face the first frame, the second frame, and the third frame.

The electric working machine may further include a housing. The housing may house therein the actuator, the controller, and the integrally-molded member. The integrally-molded member may be fixed to the housing by a fastener.

A method of assembling an electric working machine according to another aspect of the present disclosure includes: placing an actuator within a housing of the electric working machine; placing a controller within the housing, the controller being configured to control the actuator; and/or placing an integrally-molded member within the housing. The integrally-molded member is separated from the controller. The integrally-molded member contains an insulation material. The integrally-molded member includes a surface. The integrally-molded member is provided with a first conductor and a second conductor. The first conductor is integrally provided to the surface of the integrally-molded member. The first conductor is configured to supply a first current. The second conductor is integrally provided to the integrally-molded member. A portion of the second conductor is embedded into the integrally-molded member. The second conductor is configured to supply a second current.

The above-mentioned method can exhibit the same effect as in the above-mentioned electric working machine.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

Embodiment (1) Configuration of Electric Working Machine

Figure 1:
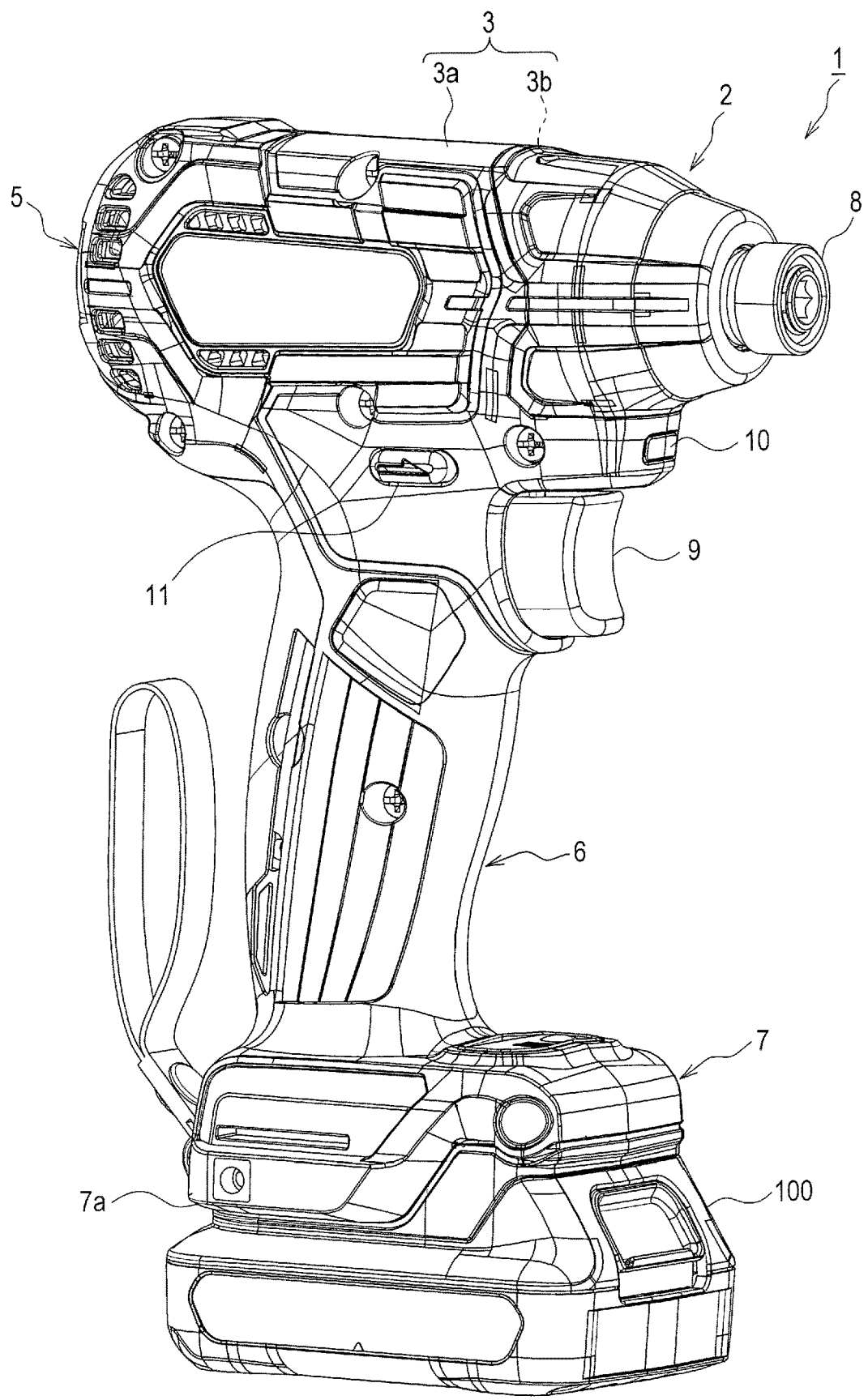
FIG. 1 is a perspective view of an electric working machine according to an embodiment.

An electric working machine 1 shown in FIG. 1 may be configured as, for example, a rechargeable impact driver. The rechargeable impact driver may be driven by electric power supplied from a battery pack 100, which is described below. The rechargeable impact driver may be used, for example, to rotate a fastening part (fastener), such as a screw, a bolt, or the like. The rechargeable impact driver may be configured to exert hammering in a rotation direction of the fastening part in accordance with a load incurred during rotation of the fastening part, to thereby allow a large torque to occur in the rotation direction.

As shown in FIG. 1, the electric working machine 1 of the present embodiment includes a main body 2 and the battery pack 100. The battery pack 100 is configured to be attachable to or detachable from the main body 2.

The main body 2 includes a housing 3. The housing 3 includes a first half housing 3a and a second half housing 3b that are divided into right and left parts. The first half housing 3a and the second half housing 3b are combined to form the housing 3. The housing 3 may be, for example, an injection-molded member that contains resin.

The main body 2 includes a first storage 5, a grip 6, and a second storage 7. The first storage 5 includes a chuck sleeve 8, a LED 10, and a rotation direction selector 11. The LED 10 emits a light outward of the electric working machine 1. The grip 6 extends from the first storage 5. The second storage 7 extends from the grip 6. The second storage 7 includes a battery port 7a, to and from which the battery pack 100 is attached and detached, respectively.

The battery pack 100 includes a battery 101 (see, FIG. 3), which is described below. The battery 101 may be, for example, a rechargeable battery that can be repeatedly charged and discharged. The battery 101 may be, for example, a lithium ion battery or a rechargeable battery other than the lithium ion battery. Here, the battery 101 may be built into the main body 2.

The grip 6 is gripped by, for example, a user of the electric working machine 1. The grip 6 includes a trigger 9. The user can perform a pull operation of the trigger 9 using a finger while gripping the grip 6.

Figure 2:
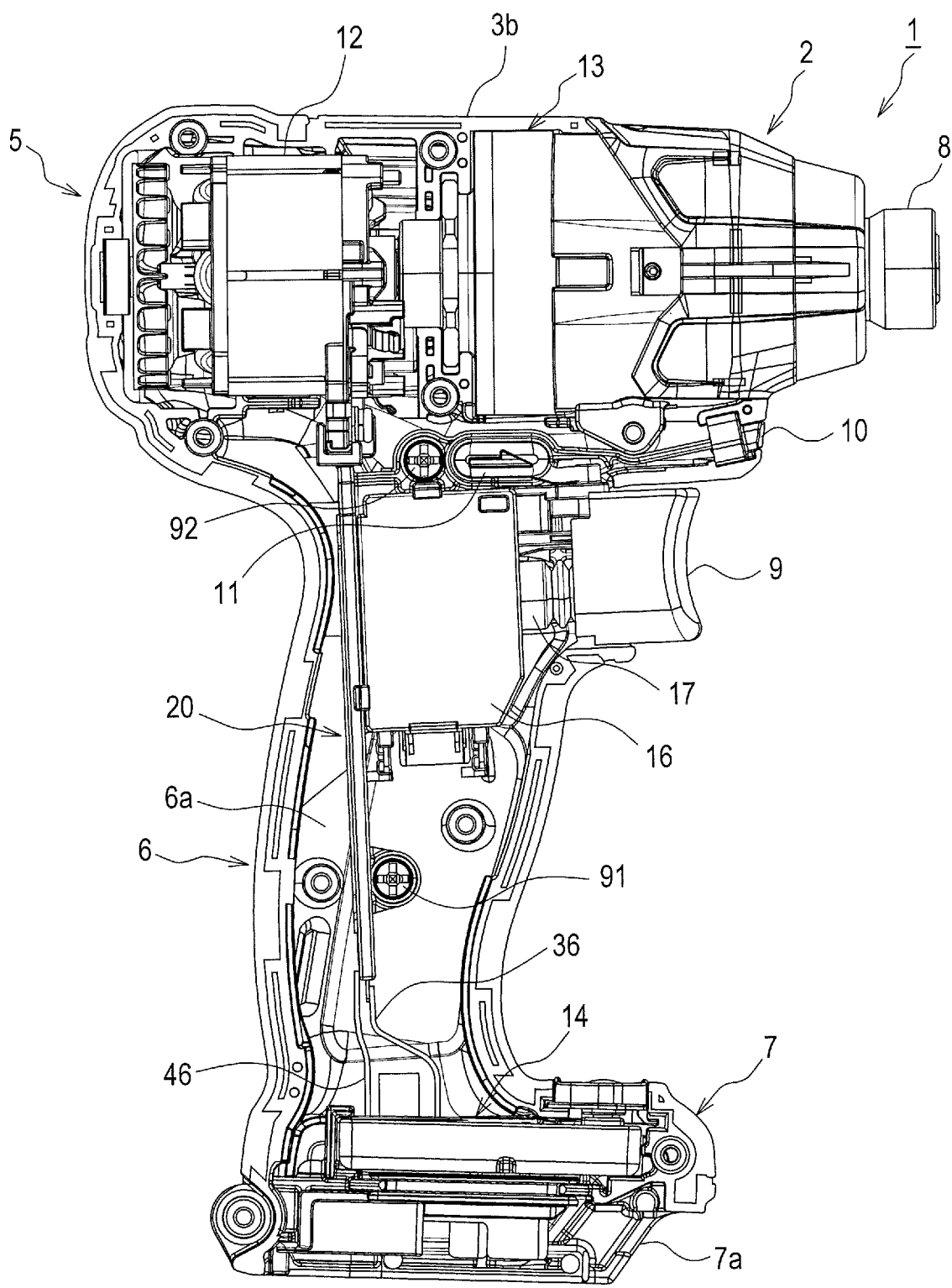
FIG. 2 is a side view showing an internal configuration of the electric working machine according to the embodiment.

Next, explanations are given to a configuration of the inside of the main body 2 that is an internal configuration of the housing 3 with reference to FIG. 2. FIG. 2 shows the electric working machine 1, from which the first half housing 3a is removed.

As shown in FIG. 2, the first storage 5 includes a motor 12, a driving mechanism 13, the above-described chuck sleeve 8, and the above-described LED 10. The chuck sleeve 8 has various tools (not shown) attached thereto, such as a driver bit, a socket bit, and the like.

The motor 12 is, for example, a brushless motor in the present embodiment. As described below, the motor 12 includes a stator 61 and a rotor 62 (see, FIG. 9). Further, as described below, the motor 12 is provided with a first Hall element 71, a second Hall element 72, and a third Hall element 73 (see, FIG. 11). The first Hall element 71, the second Hall element 72, and the third Hall element 73 each output a rotation detection signal in accordance with a rotation position of the motor 12 (specifically, a rotation position of the rotor 62).

The motor 12 generates a rotational driving force (specifically, the rotational driving force generated by the rotor 62) and the rotational driving force is transmitted to the driving mechanism 13. The driving mechanism 13 includes, for example, a deceleration mechanism (not shown) and a hammering mechanism (not shown). The deceleration mechanism decreases the rotational driving force of the motor 12 to have a rotational speed lower than a rotational speed of the motor 12 is and then transmits the decreased rotational driving force to the hammering mechanism.

The hammering mechanism may include a spindle (not shown), a hammer (not shown), and an anvil (not shown). The spindle rotates with the rotational driving force of the motor 12. The rotational driving force is transmitted via the deceleration mechanism. The hammer rotates together with the spindle in accordance with rotation of the spindle. Further, the hammer is movable in a direction that is parallel with a rotation axis of the chuck sleeve 8. The anvil has the chuck sleeve 8 attached thereto.

In the hammering mechanism, the spindle rotates in response to rotation of the motor 12. In response to this, the anvil rotates via the hammer and then the chuck sleeve 8 rotates (consequently, the tools rotate). As work with tools (for example, screwing) proceeds and a load imposed on the anvil exceeds a specified level, the hammer applies hammering on the anvil in a direction in which the chuck sleeve 8 rotates. This hammering increases a rotational torque of the chuck sleeve 8.

The second storage 7 includes a controller 14. The controller 14 achieves various functions of the electric working machine 1. The controller 14 is supplied with the electric power of the battery 101 from the battery pack 100, which is attached to the main body 2. The controller 14 operates with the electric power supplied from the battery 101 (hereinafter, referred to as "battery power").

The controller 14, the motor 12, the LED 10, the first Hall element 71, the second Hall element 72, and the third Hall element 73 each are electrically coupled to a resin wiring unit (resin wiring part) 20. The controller 14 is electrically coupled to the motor 12, the LED 10, the first Hall element 71, the second Hall element 72, and the third Hall element 73 via the resin wiring unit 20.

The battery power is supplied to the motor 12, the LED 10, the first Hall element 71, the second Hall element 72, and the third Hall element 73 via the controller 14. Here, at least one of the motor 12, the LED 10, the first Hall element 71, the second Hall element 72, or the third Hall element 73 may be supplied with the battery power without the medium of the controller 14.

The grip 6 includes the resin wiring unit 20, the above-described trigger 9, a switch box 16, and a plunger 17. The switch box 16 incorporates therein a trigger switch 115 (see, FIG. 3), which is described below.

The trigger 9 is coupled to the switch box 16 via the plunger 17. In response to operation of the trigger 9 by the user, the plunger 17 moves together with the trigger 9 in a direction in which the trigger 9 is operated. The trigger switch 115 situated in the switch box 16 is switched ON or OFF in accordance with a position of the plunger 17. For example, the trigger switch 115 is switched OFF in response to no pulling operation of the trigger 9 being made. The trigger switch 115 is switched ON in response to the pulling operation of the trigger 9 being made more than a specified amount.

The resin wiring unit 20 is placed within the housing 3, more particularly, in an internal hollow 6a in the grip 6. The resin wiring unit 20 is disposed and separated from the controller 14 (in other words, a distinct and separate part from the controller 14). The resin wiring unit 20 electrically couples the controller 14 to the motor 12, the LED 10, the first Hall element 71, the second Hall element 72, and the third Hall element 73. Specifically, electric power for driving the motor 12 is supplied from the controller 14 via the resin wiring unit 20. Electric power for driving the LED 10 and electric power for driving each of the first Hall element 71, the second Hall element 72, and the third Hall element 73 are supplied from the controller 14 via the resin wiring unit 20. The first Hall element 71, the second Hall element 72, and the third Hall element 73 each output the rotation detection signal, which is input into the controller 14 via the resin wiring unit 20.

The motor 12 is supplied with a three-phase alternating power. In other words, the motor 12 is supplied with a U-phase drive current, a V-phase drive current, and a W-phase drive current. During normal operation of the electric working machine 1 (hereinafter, simply referred to as normal operation), the maximum value of each of the U-phase drive current, the V-phase drive current, and the W-phase drive current is larger than: the maximum value of an electric current supplied to the LED 10 (hereinafter, referred to as "LED drive current"); the maximum value of an electric current supplied to each of the first Hall element 71, the second Hall element 72, and the third Hall element 73 (hereinafter, referred to as "Hall element drive current"); and the maximum value of an electric current that corresponds to the rotation detection signal input into the controller 14 from each of the first Hall element 71, the second Hall element 72, and the third Hall element 73 (hereinafter, referred to as "rotation detection current"). A process of assembling the electric working machine includes placing the motor 12 within the housing 3, placing the controller 14 within the housing 3, and placing the resin wiring unit 20 within the housing 3. These may be performed in any order. In addition, multiple works may be performed simultaneously.

Here, the electric working machine 1 carries various electric currents, which are classified into a large electric current and a small electric current. The large electric current is an electric current of which the maximum current value can be equal to or more than a specified boundary value during the normal operation. The small electric current is an electric current of which the maximum current value is equal to or smaller than the specified boundary value during the normal operation. The motor drive current belongs to the large electric current. In contrast, the LED drive current, the Hall element drive current, and the rotation detection current each belong to the small electric current. In other words, the resin wiring unit 20 carries: the motor drive current, which belongs to the large electric current, and the LED drive current, the Hall element drive current, and rotation detection current, each of which belongs to the small electric current. Here, the large electric current and the small electric current may be determined in any manner. For example, based on a design-rated current value, an electric current, in which the rated-current value is equal to or more than a specified value, may be classified into the large electric current; and an electric current, in which the rated-current value is equal to or smaller than the specified value, may be classified into the small electric current.

In the present embodiment, the resin wiring unit 20 is fixed to the housing 3 by a first screw 91 and a second screw 92. More specifically, the resin wiring unit 20 is fixed to the second half housing 3b by the first screw 91 and the second screw 92.

The resin wiring unit 20 is electrically coupled to the controller 14 via a first lead wire group 36 and a second lead wire group 46. The first lead wire group 36 includes three first lead wires (not shown) and couples the controller 14 to the motor 12 via the resin wiring unit 20. The second lead wire group 46 includes eight second lead wires (not shown) and couples the controller 14 to the LED 10, the first Hall element 71, the second Hall element 72, and the third Hall element 73 via the resin wiring unit 20.

(2) Electrical Configuration of Electric Working Machine

Figure 3:
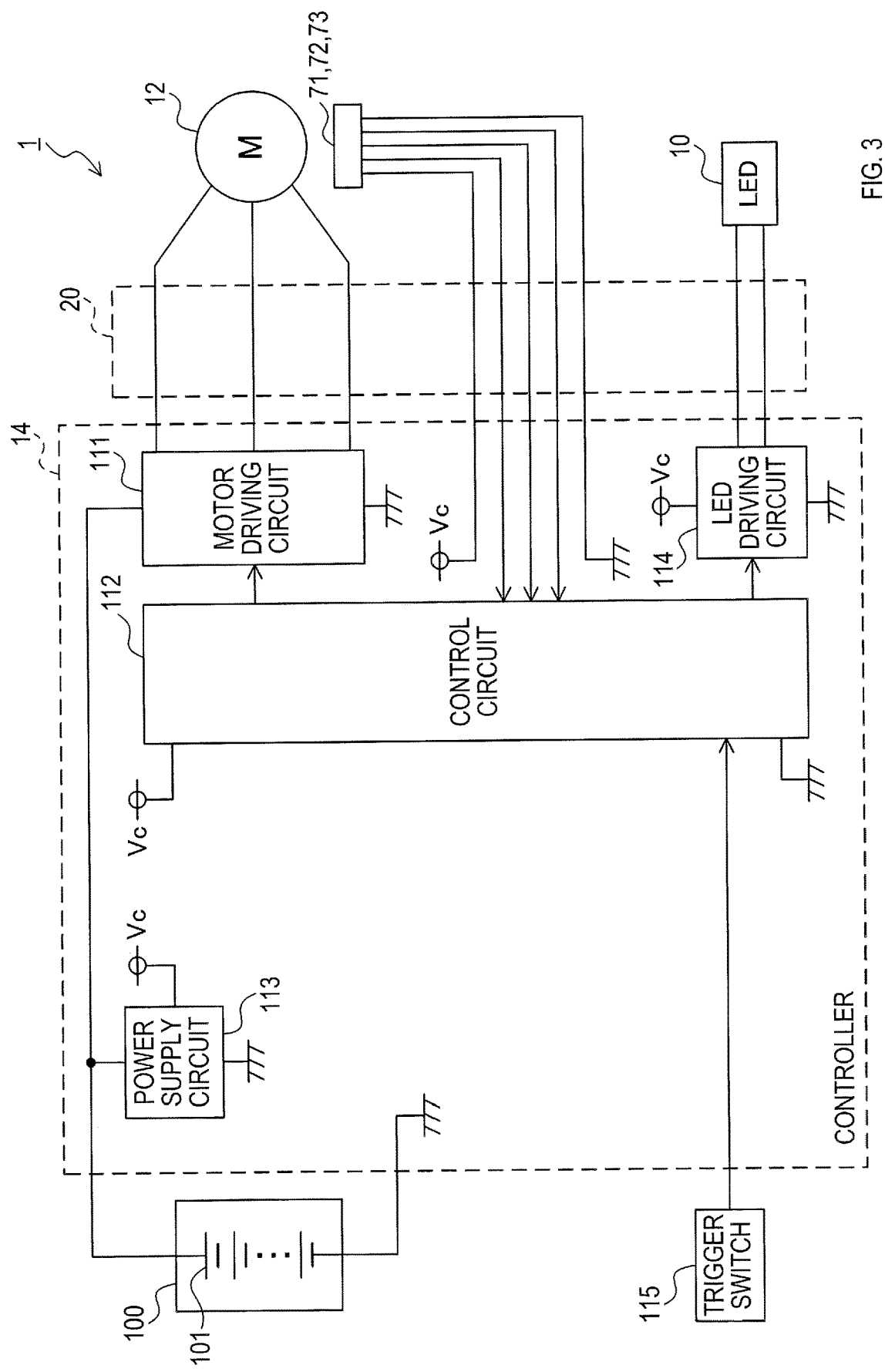
FIG. 3 is a block diagram showing an electrical configuration of the electric working machine according to the embodiment.

Additional explanations are given to an electrical configuration of the electric working machine 1 with reference to FIG. 3. FIG. 3 shows the electrical configuration of the electric working machine 1, in which the battery pack 100 is attached to the main body 2. As shown in FIG. 3, the motor 12, the LED 10, the first Hall element 71, the second Hall element 72, the third Hall element 73, the trigger switch 115, and the battery 101 are coupled to the controller 14.

The controller 14 includes a motor driving circuit 111, a control circuit 112, a power supply circuit 113, and a LED driving circuit 114.

In accordance with a motor drive command input from the control circuit 112, the motor driving circuit 111 converts the battery power into the U-phase drive current, the V-phase drive current, and the W-phase drive current in order to drive the motor 12. The motor driving circuit 111 outputs the U-phase drive current, the V-phase drive current, and the W-phase drive current to the motor 12.

The power supply circuit 113 generates a power-supply power from the battery power and outputs the same. The power-supply power is power to operate component parts within the controller 14 and has a power-supply voltage Vc that has a constant voltage value. The control circuit 112 and the LED driving circuit 114 operate with the power-supply power.

Further, the power-supply power is supplied to the first Hall element 71, the second Hall element 72, and the third Hall element 73. The above-described Hall element drive current corresponds to the power-supply power that is supplied to the first Hall element 71, the second Hall element 72, and the third Hall element 73.

The LED driving circuit 114 supplies the power-supply power to the LED 10 in accordance with a LED drive command input from the control circuit 112, to thereby light the LED 10. The above-described LED drive current corresponds to the power-supply power that is supplied to the LED 10.

The control circuit 112 includes, for example, a CPU (not shown) and a memory (not shown). For example, the CPU executes various programs stored in the memory, to thereby achieve the various functions of the electric working machine 1. The various functions include a function to control the motor 12 by the motor drive command and a function to control the LED 10 by the LED drive command.

The control circuit 112 receives a trigger signal from the trigger switch 115. The trigger signal shows whether the trigger switch 115 is switched ON or OFF. Further, the control circuit 112 receives the rotation detection signal from each of the first Hall element 71, the second Hall element 72, and the third Hall element 73. The control circuit 112 further receives a rotation direction signal that indicates a rotation direction selected by the rotation direction selector 11. The control circuit 112 controls the motor 12 and the LED 10 based on at least one of various signals that include the trigger signal, each rotation detection signal, and the rotation direction signal. For example, the control circuit 112 recognizes that the trigger switch 115 is switched ON based on the trigger signal and in response to this, rotates the motor 12 in a rotation direction indicated by the rotation direction signal.

As shown in FIG. 3, an electrical wiring that couples each of the motor 12, the LED 10, the first Hall element 71, the second Hall element 72, and the third Hall element 73 to the controller 14 includes the above-described resin wiring unit 20.

(3) Explanations on Resin Wiring Unit

Figure 4:
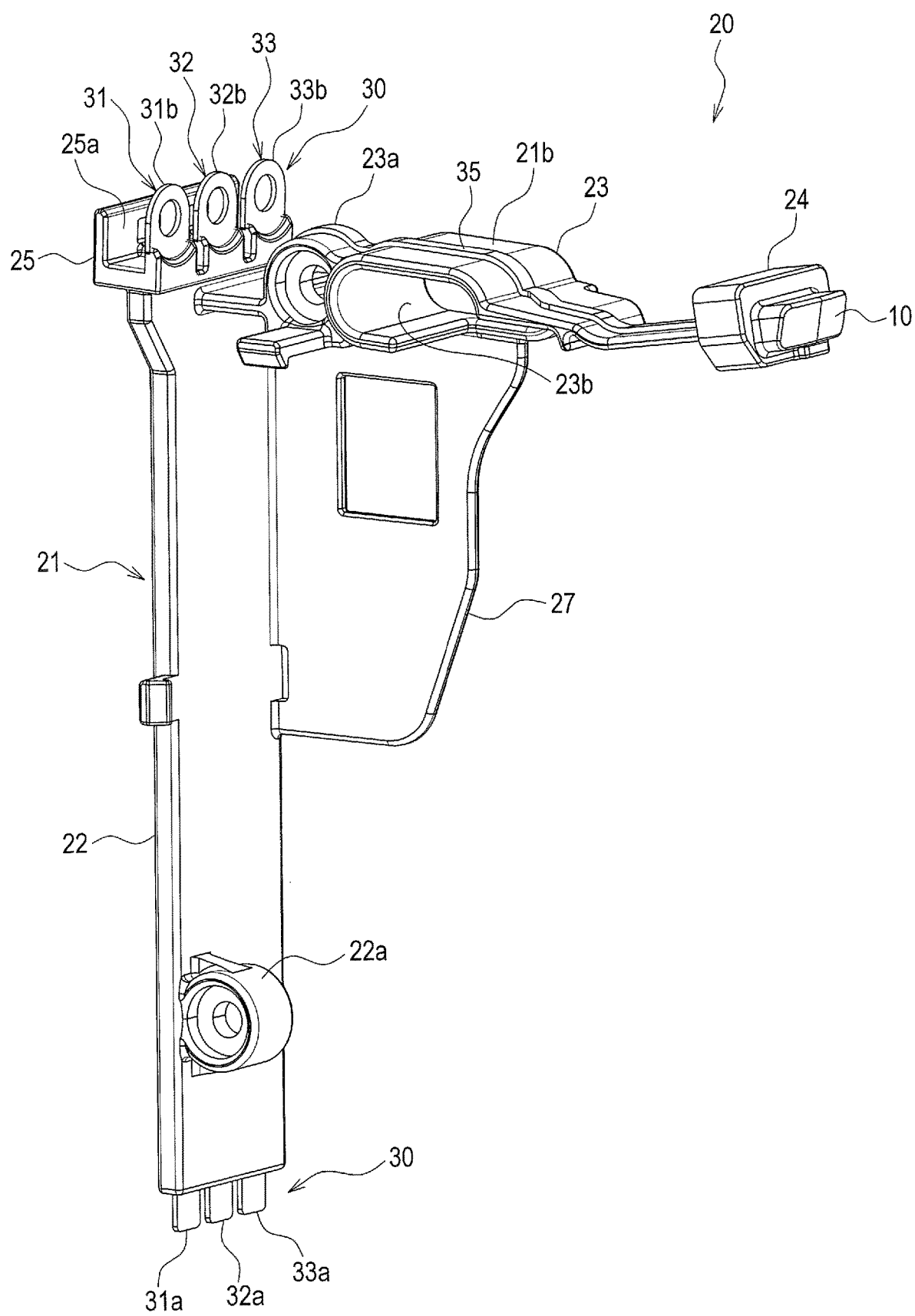
FIG. 4 is a first perspective view showing a resin wiring unit according to the embodiment.
Figure 5:
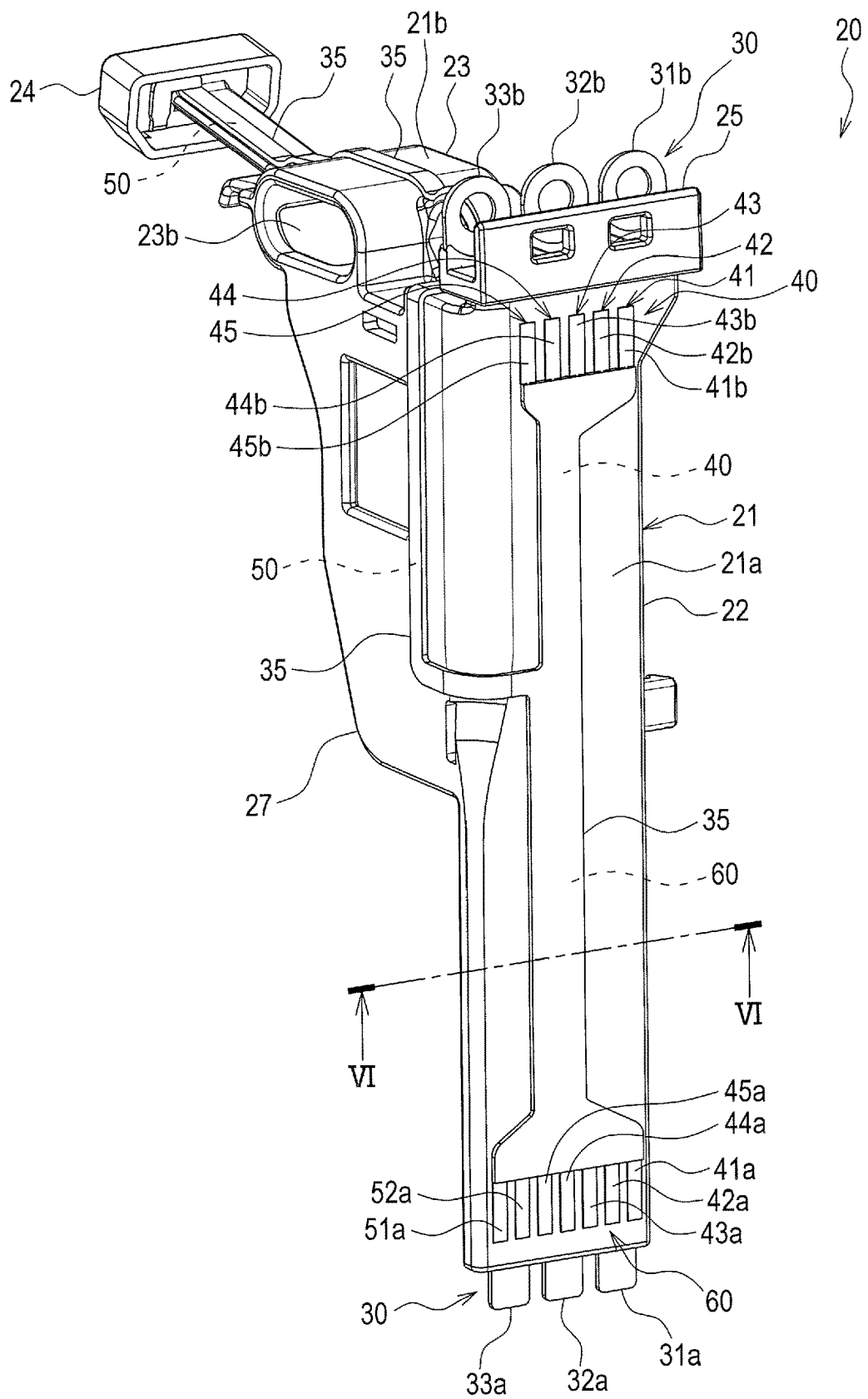
FIG. 5 is a second perspective view showing the resin wiring unit according to the embodiment.
Figure 6:
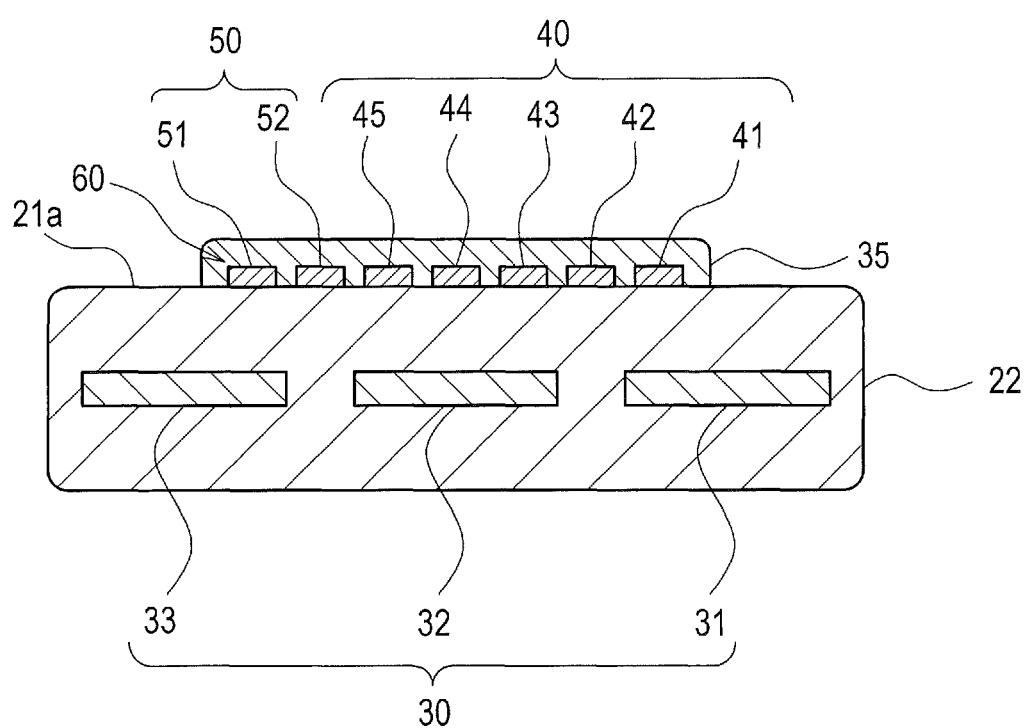
FIG. 6 is a sectional view in the resin wiring unit of FIG. 5 along a line VI-VI.
Figure 7:
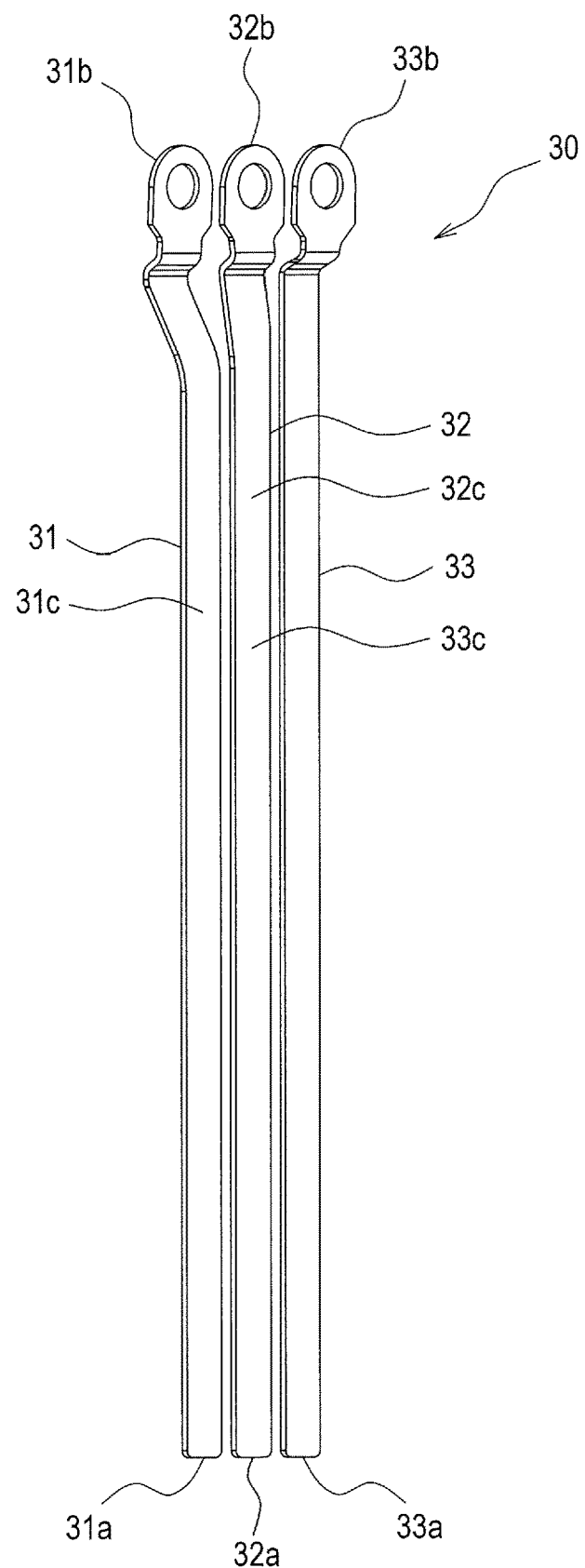
FIG. 7 is a perspective view of a main current wiring portion according to the embodiment.
Figure 8:
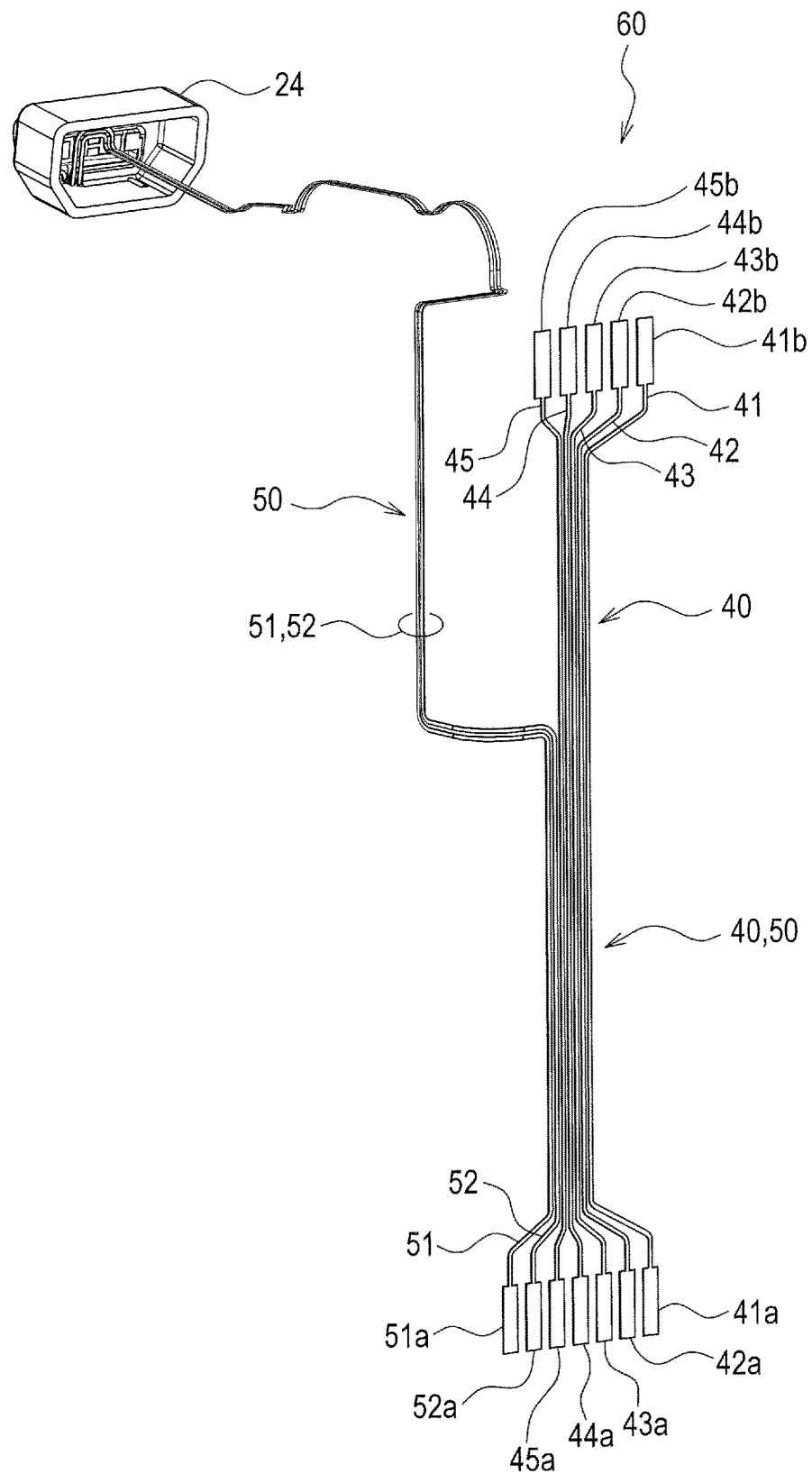
FIG. 8 is a perspective view of a wiring pattern according to the embodiment.

Explanations are given to a configuration of the resin wiring unit 20 with mainly reference to FIGS. 4 to 6, and to FIG. 7 or 8, if necessary. The resin wiring unit 20 includes a frame 21 (see, FIGS. 4 and 5), a main current wiring portion 30, and a wiring pattern 60 (see, FIGS. 5 and 6). The main current wiring portion 30 electrically couples the controller 14 and the motor 12 together. The wiring pattern 60 electrically couples the LED 10, the first Hall element 71, the second Hall element 72, and the third Hall element 73 to the controller 14.

The frame 21 includes a first frame 22, a second frame 23, a LED attachment 24, an electrode receiver 25, and a third frame 27. The frame 21 is a resin-molded member that is integrally molded with resin. More specifically, the frame 21 of the present embodiment contains, for example, a thermoplastic resin and is integrally molded by an injection molding method.

Additionally, the present embodiment uses insert molding in combination with the injection molding method in a process of molding the frame 21. Specifically, the insert molding is performed in order to embed a portion of the main current wiring portion 30 into the frame 21 in the process of molding the frame 21.

The first frame 22 is formed into a plate shape and includes a plate surface. The second frame 23 extends from the plate surface of the first frame 22 so as to intersect the plate surface. The second frame 23 may extend from the plate surface to be perpendicular or approximately perpendicular to the plate surface. The third frame 27 is formed into a plate shape. The third frame 27 may extend from the plate surface so as to intersect the plate surface. The third frame 27 extends from an edge of the first frame 22 and an edge of the second frame 23. The third frame 27 may extend from the plate surface in a manner to be perpendicular or approximately perpendicular to the plate surface.

The switch box 16 is situated in an area that is surrounded by the first frame 22, the second frame 23, and the third frame 27 (see, FIG. 2). Specifically, the switch box 16 is placed to face the first frame 22, the second frame 23, and the third frame 27.

As shown in FIG. 7, the main current wiring portion 30 includes a first conductor bar 31, a second conductor bar 32, and a third conductor bar 33. Here, FIG. 7 shows only the main current wiring portion 30 that is drawn out of the resin wiring unit 20 shown in FIG. 5. The first conductor bar 31, the second conductor bar 32, and the third conductor bar 33 each are a bar-shaped conductor and more specifically, a bar-shaped metal. The first conductor bar 31, the second conductor bar 32, and the third conductor bar 33 may contain any metal. The first conductor bar 31, the second conductor bar 32, and the third conductor bar 33 may contain, for example, copper, iron, or nickel. Further, respective surfaces of the first conductor bar 31, the second conductor bar 32, and the third conductor bar 33 may be plated with, for example, gold or other metal.

The first conductor bar 31 includes a first terminal 31a, a second terminal 31b, and an elongated portion 31c. The first terminal 31a is situated in a first end of the elongated portion 31c and the second terminal 31b is situated in a second end of the elongated portion 31c. The second conductor bar 32 includes a first terminal 32a, a second terminal 32b, and an elongated portion 32c. The first terminal 32a is situated in a first end of the elongated portion 32c and the second terminal 32b is situated in a second end of the elongated portion 32c. The third conductor bar 33 includes a first terminal 33a, a second terminal 33b, and an elongated portion 33c. The first terminal 33a is situated in a first end of the elongated portion 33c and the second terminal 33b is situated in a second end of the elongated portion 33c. Each of the second terminals 31b, 32b, and 33b include a screw hole.

In the process of molding the frame 21, the portion of the main current wiring portion 30 is embedded into the frame 21 by the insert molding to be integral with the frame 21, as shown in FIGS. 4 to 6.

As shown in FIGS. 4 and 5, the first terminals 31a, 32a, and 33a and the second terminals 31b, 32b, and 33b in the main current wiring portion 30 are exposed from the frame 21 in the present embodiment.

In contrast, a portion of each of the first conductor bar 31, the second conductor bar 32, and the third conductor bar 33 is embedded into the frame 21. More specifically, the entirety or nearly the entirety of the elongated portion 31c in the first conductor bar 31 is embedded into the first frame 22. The same configuration applies to the elongated portion 32c in the second conductor bar 32 and the elongated portion 33c in the third conductor bar 33.

The first conductor bar 31, the second conductor bar 32, and the third conductor bar 33 each carry the motor drive current that is supplied from the motor 12 to the controller 14. Specifically, the first conductor bar 31 supplies, for example, the U-phase drive current. The second conductor bar 32 supplies, for example, the V-phase drive current. The third conductor bar 33 supplies, for example, the W-phase drive current. In other words, the U-phase drive current output from the controller 14 is supplied to the motor 12 via, for example, the first conductor bar 31; the V-phase drive current output from the controller 14 is supplied to the motor 12 via, for example, the second conductor bar 32; and the W-phase drive current output from the controller 14 is supplied to the motor 12 via, for example, the third conductor bar 33.

Each of the first terminals 31a, 32a, and 33a is coupled to the controller 14 via corresponding one of the first lead wires that is included in the above-described first lead wire group 36.

The resin wiring unit 20 of the present embodiment may be one kind of Molded Interconnect Devices (MID). The MID is a resin-molded member, in which an electric circuit is formed. In the resin wiring unit 20, the wiring pattern 60 is formed on a surface of the frame 21.

The MID can be formed by various methods. As one method of forming the MID, there has been known a Laser Direct Structuring (LDS) method. In the resin wiring unit 20, the wiring pattern 60 may be formed on the frame 21 by, for example, the LDS method. More specifically, the wiring pattern 60 may be formed by the LDS method on the frame 21, on which the main current wiring portion 30 is disposed by the insert molding.

As shown in FIG. 8, the wiring pattern 60 includes a Hall element pattern 40 and a LED pattern 50. Here, FIG. 8 shows only the wiring pattern 60 that is drawn out of the resin wiring unit 20 shown in FIG. 5. The wiring pattern 60 may be, for example, a conductor pattern formed with a copper foil.

The Hall element pattern 40 is formed on a first surface (first frame surface) 21a of the first frame 22. The LED pattern 50 is formed on the first surface 21a and a second surface (second frame surface) 21b of the second frame 23.

The Hall element pattern 40 includes a first Hall element conductor pattern 41, a second Hall element conductor pattern 42, a third Hall element conductor pattern 43, a fourth Hall element conductor pattern 44, a fifth Hall element conductor pattern 45.

The first Hall element conductor pattern 41 includes a first terminal 41a and a second terminal 41b, respectively in a first end and a second end of the first Hall element conductor pattern 41. The second Hall element conductor pattern 42 includes a first terminal 42a and a second terminal 42b, respectively, in a first end and a second end of the second Hall element conductor pattern 42. The third Hall element conductor pattern 43 includes a first terminal 43a and a second terminal 43b, respectively, in a first end and a second end of the third Hall element conductor pattern 43. The fourth Hall element conductor pattern 44 includes a first terminal 44a and a second terminal 44b, respectively, in a first end and a second end of the fourth Hall element conductor pattern 44. The fifth Hall element conductor pattern 45 includes a first terminal 45a and a second terminal 45b, respectively, in a first end and a second end of the fifth conductor Hall element pattern 45.

The Hall element pattern 40 electrically couples the first Hall element 71, the second Hall element 72, and the third Hall element 73 to the controller 14. The first Hall element conductor pattern 41 and the second Hall element conductor pattern 42 each carry, for example, the Hall element drive current. Specifically, the first Hall element conductor pattern 41 and the second Hall element conductor pattern 42 each supply the Hall element drive current to the first Hall element 71, the second Hall element 72, and the third Hall element 73. The third Hall element conductor pattern 43, the fourth Hall element conductor pattern 44, and the fifth Hall element conductor pattern 45 each have the rotation detection signal transmitted thereto. The rotation detection signal is output from corresponding one of the first Hall element 71, the second Hall element 72, or the third Hall element 73. Specifically, the first Hall element 71, the second Hall element 72, and the third Hall element 73 each supply corresponding rotation detection signal to the controller 14.

The first terminals 41a, 42a, 43a, 44a, and 45a in the Hall element pattern 40 each are coupled to the controller 14 via corresponding one of the second lead wires included in the above-described second lead wire group 46.

The LED pattern 50 includes a first LED conductor pattern 51 and a second LED conductor pattern 52. The first LED conductor pattern 51 includes a first terminal 51a in a first end of the first LED conductor pattern 51. The second LED conductor pattern 52 includes a first terminal 52a in a first end of the second LED conductor pattern 52. In respective second ends, the first LED conductor pattern 51 and the second LED conductor pattern 52 are coupled to the LED 10, which is fixed to the LED attachment 24.

The LED pattern 50 couples the controller 14 and the LED 10 together. The first LED conductor pattern 51 and the second LED conductor pattern 52 each carry the above-described LED drive current. The first terminals 51a and 52a in the LED pattern 50 each are coupled to the controller 14 via corresponding one of the second lead wires included in the above-described second lead wire group 46.

As shown in FIGS. 4 to 6, the wiring pattern 60 is covered with an insulation covering member 35 except some portions of the wiring pattern 60. The insulation covering member 35 contains an insulation material. In the present embodiment, the insulation covering member 35 is disposed on the surface of the frame 21 by low temperature and pressure molding in a manner to cover the wiring pattern 60.

The low temperature and pressure molding is a publicly known molding method that is also known as hot-melt molding. The insulation covering member 35 may be disposed, for example, by the following step. Specifically, a metal mold is prepared in advance to correspond to a laying shape of the wiring pattern 60. Then, after the wiring pattern 60 is formed on the frame 21, the metal mold is brought into abutment with the wiring pattern 60 on a specified position along the wiring pattern 60. Then, molten resin having a low melting point (for example, a thermoplastic resin) is injected into the metal mold and the injected resin is cured. The step of forming the insulation covering member 35 ends by removing the metal mold after the injected resin is cured.

In the frame 21, the first frame 22 includes a screw hole 22a. The screw hole 22a has the above-described first screw 91 screwed therein. The second frame 23 includes a screw hole 23a. The screw hole 23a has the above-described second screw 92 screwed therein. In addition, the second frame 23 includes a selector insertion hole 23b. The selector insertion hole 23b has the above-described rotation direction selector 11 inserted therein. The rotation direction selector 11 moves through the selector insertion hole 23b (for example, a reciprocating movement) in response to the user operating the rotation direction selector 11 to select a rotation direction.

(4) Coupling between Resin Wiring Unit and Motor

Next, explanations are given to coupling between the resin wiring unit 20 and the motor 12 with reference to FIGS. 9 to 13.

Figure 9:
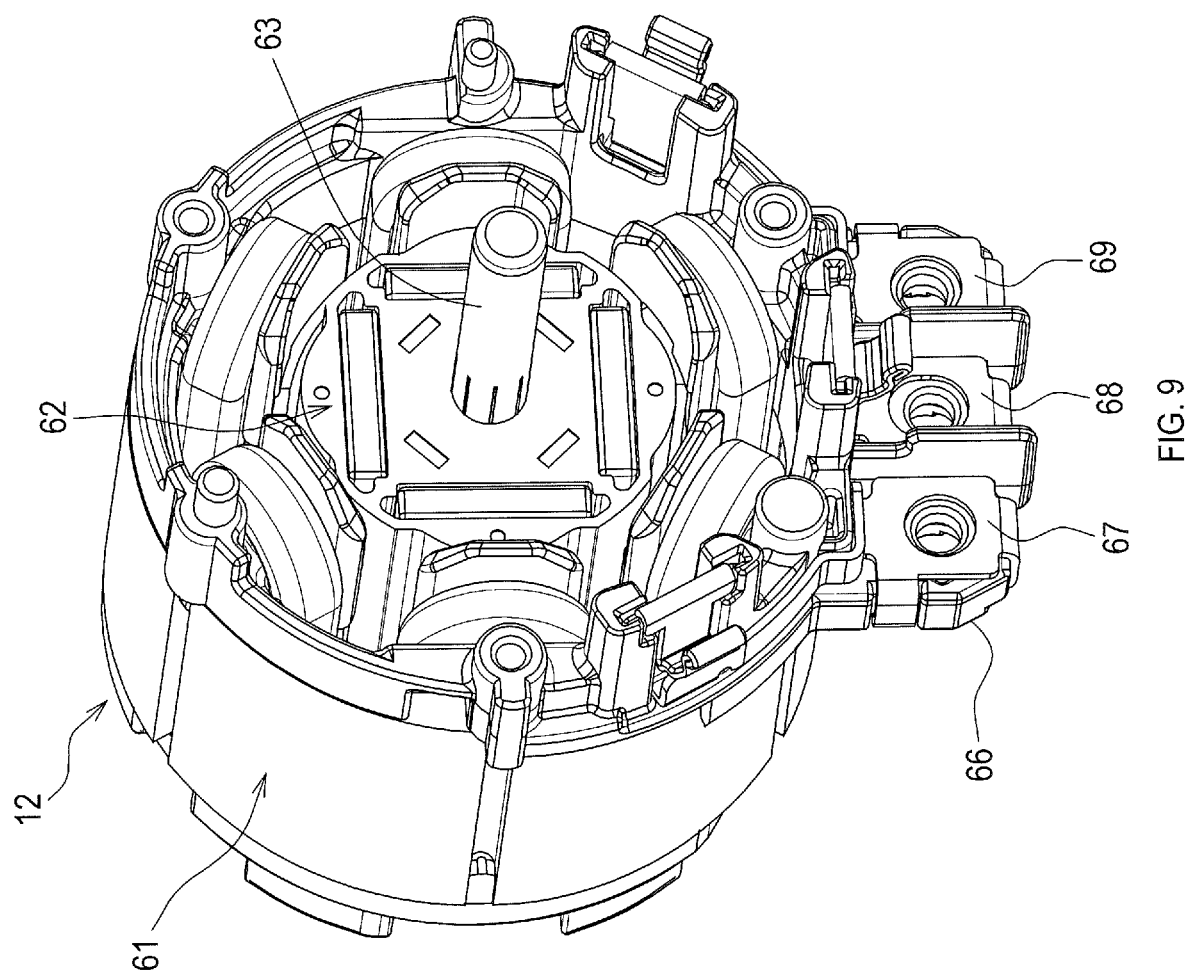
FIG. 9 is a perspective view of a motor according to the embodiment.

As shown in FIG. 9, the motor 12 includes the stator 61 and the rotor 62. The rotor 62 is provided with a shaft 63 that rotates together with the rotor 62. The stator 61 includes a U-phase coil, a V-phase coil, and a W-phase coil. The rotor 62 includes two or more permanent magnets.

Figure 10:
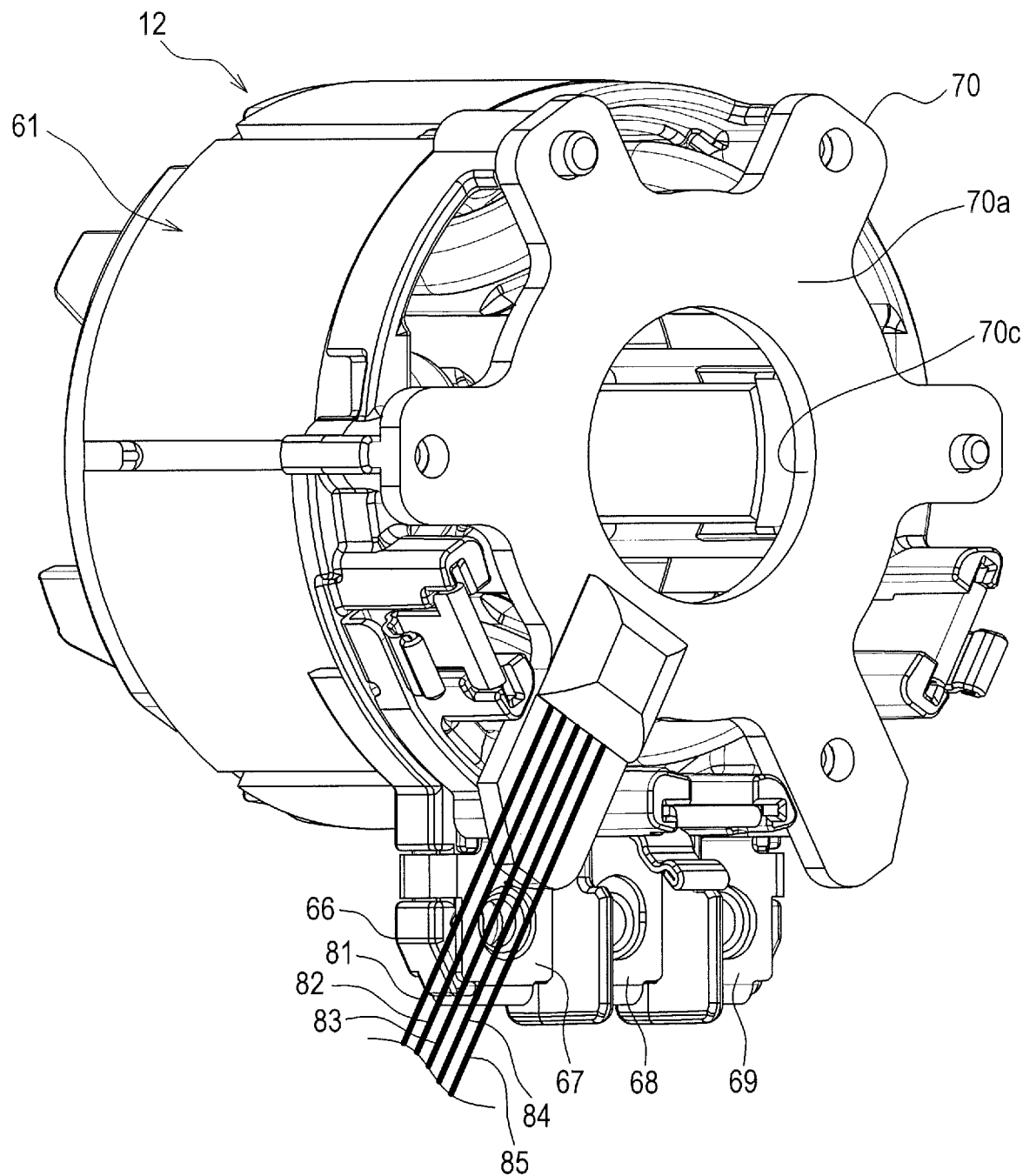
FIG. 10 is a perspective view of the motor, to which a printed board is attached.

The first Hall element 71, the second Hall element 72, and the third Hall element 73 are provided to the motor 12. The first Hall element 71, the second Hall element 72, and the third Hall element 73 may be provided to the motor 12 in any manner. For example, the first Hall element 71, the second Hall element 72, and the third Hall element 73 may be provided to the printed board 70, which is disposed on the motor 12 as shown in FIG. 10. Here, FIG. 10 omits illustration of the rotor 62.

Figure 11:
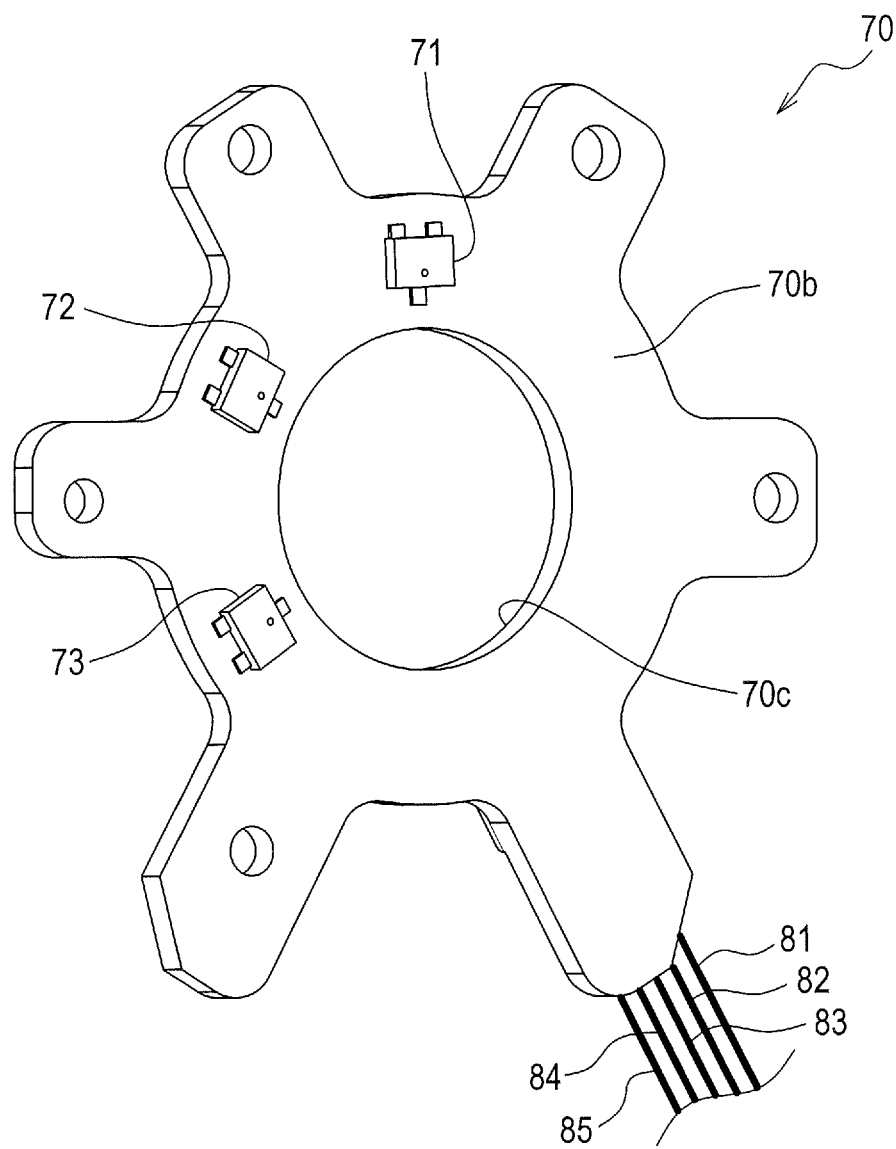
FIG. 11 is a perspective view showing a Hall element that is disposed on the printed board.

As shown in FIGS. 10 and 11, the printed board 70 may be, for example, a plate-shaped member that includes a first surface 70a, a second surface 70b, and an insertion hole 70c. As shown in FIG. 10, the printed board 70 may be disposed on the motor 12 such that the first surface 70a faces the driving mechanism 13 and the second surface 70b faces the rotor 62. The shaft 63 is inserted through the insertion hole 70c.

As shown in FIG. 10, the first surface 70a may have wiring members 81 to 85 coupled thereto. As shown in FIG.

11, the first Hall element 71, the second Hall element 72, and the third Hall element 73 may be provided to the second surface 70b. The first Hall element 71, the second Hall element 72, and the third Hall element 73 are electrically coupled to the wiring members 81 to 85 via, for example, a wiring group (not shown). The wiring members 81 to 85 electrically couple the first Hall element 71, the second Hall element 72, and the third Hall element 73 to the resin wiring unit 20.

The first Hall element 71, the second Hall element 72, and the third Hall element 73 are situated along a rotation direction of the shaft 63 about a rotation axis of the shaft 63 and are separated from each other by an angle that corresponds to 120 degrees in electrical angle.

The motor 12 further includes an electrode attaching portion 66. The electrode attaching portion 66 protrudes from a portion in an outer surface of the stator 61. The electrode attaching portion 66 includes a first electrode 67, a second electrode 68, and a third electrode 69. The first electrode 67, the second electrode 68, and the third electrode 69 each are coupled to at least one of the U-phase coil, the V-phase coil, or the W-phase coil. The first electrode 67, the second electrode 68, and the third electrode 69 each include a screw hole.

The electrode receiver 25 of the resin wiring unit 20 includes a groove 25a. The electrode attaching portion 66 is inserted into the groove 25a. In response to insertion of the electrode attaching portion 66 into the groove 25a, the second terminal 31b of the first conductor bar 31 faces the first electrode 67; the second terminal 32b of the second conductor bar 32 faces the second electrode 68; and the second terminal 33b of the third conductor bar 33 faces the third electrode 69.

Figure 12:
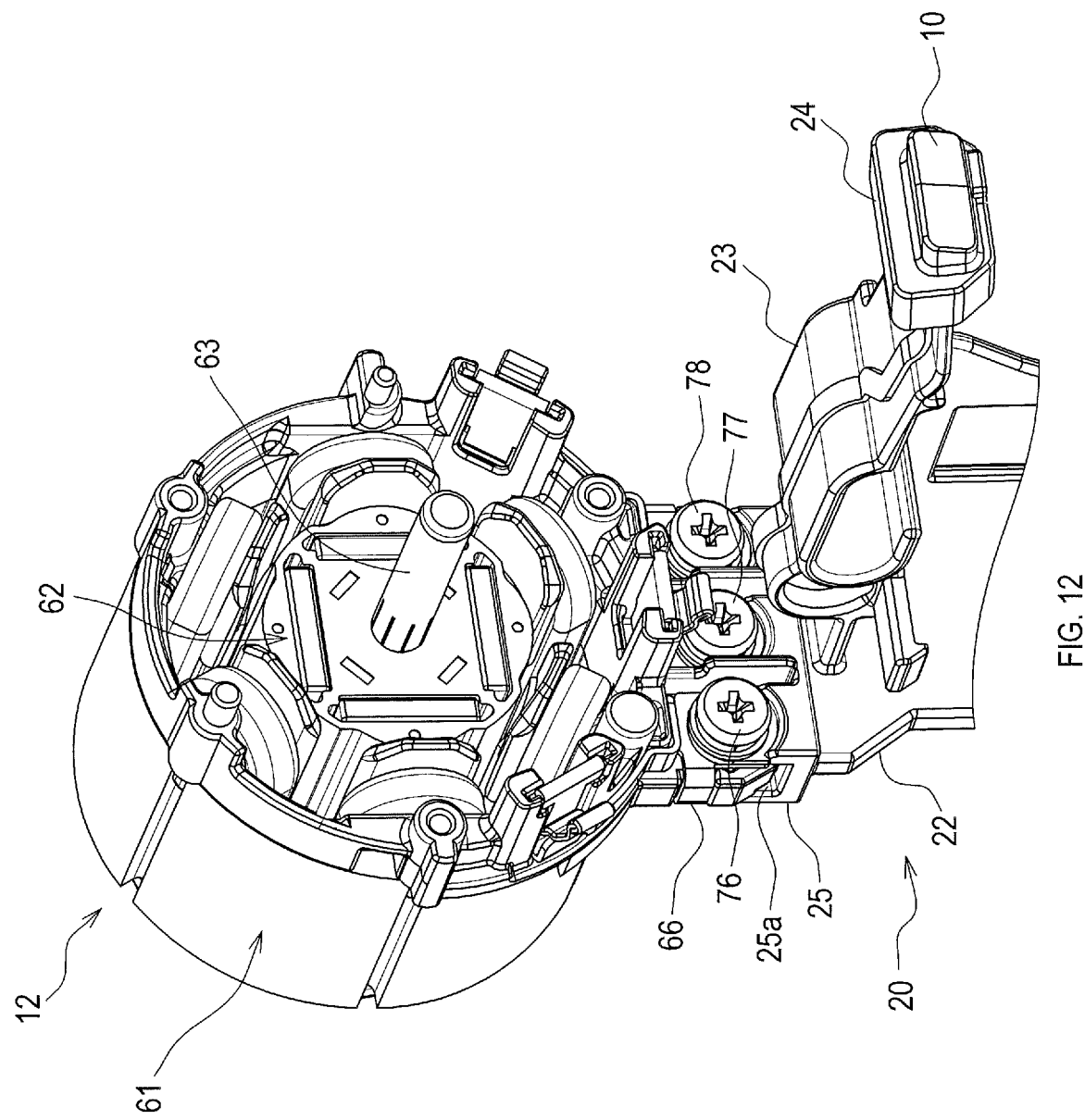
FIG. 12 is a third perspective view showing the motor, to which the resin wiring unit is coupled.

As shown in FIG. 12, with each second terminal facing corresponding one of the electrodes, the respective screw holes in the second terminal 31b of the first conductor bar 31 and in the first electrode 67 receive a first coupling screw 76 screwed therein, thereby fixing the second terminal 31b of the first conductor bar 31 and the first electrode 67 together while they contact each other. Similarly, the respective screw holes in the second terminal 32b of the second conductor bar 32 and in the second electrode 68 receive a second coupling screw 77 screwed therein, thereby fixing the second terminal 32b of the second conductor bar 32 and the second electrode 68 together while they contact each other. Similarly, the respective screw holes in the second terminal 33b of the third conductor bar 33 and in the third electrode 69 receive a third coupling screw 78 screwed therein, thereby fixing the second terminal 33b of the third conductor bar 33 and the third electrode 69 together while they contact each other. In this way, the resin wiring unit 20 and the motor 12 are mechanically fixed together and electrically coupled together.

Figure 13:
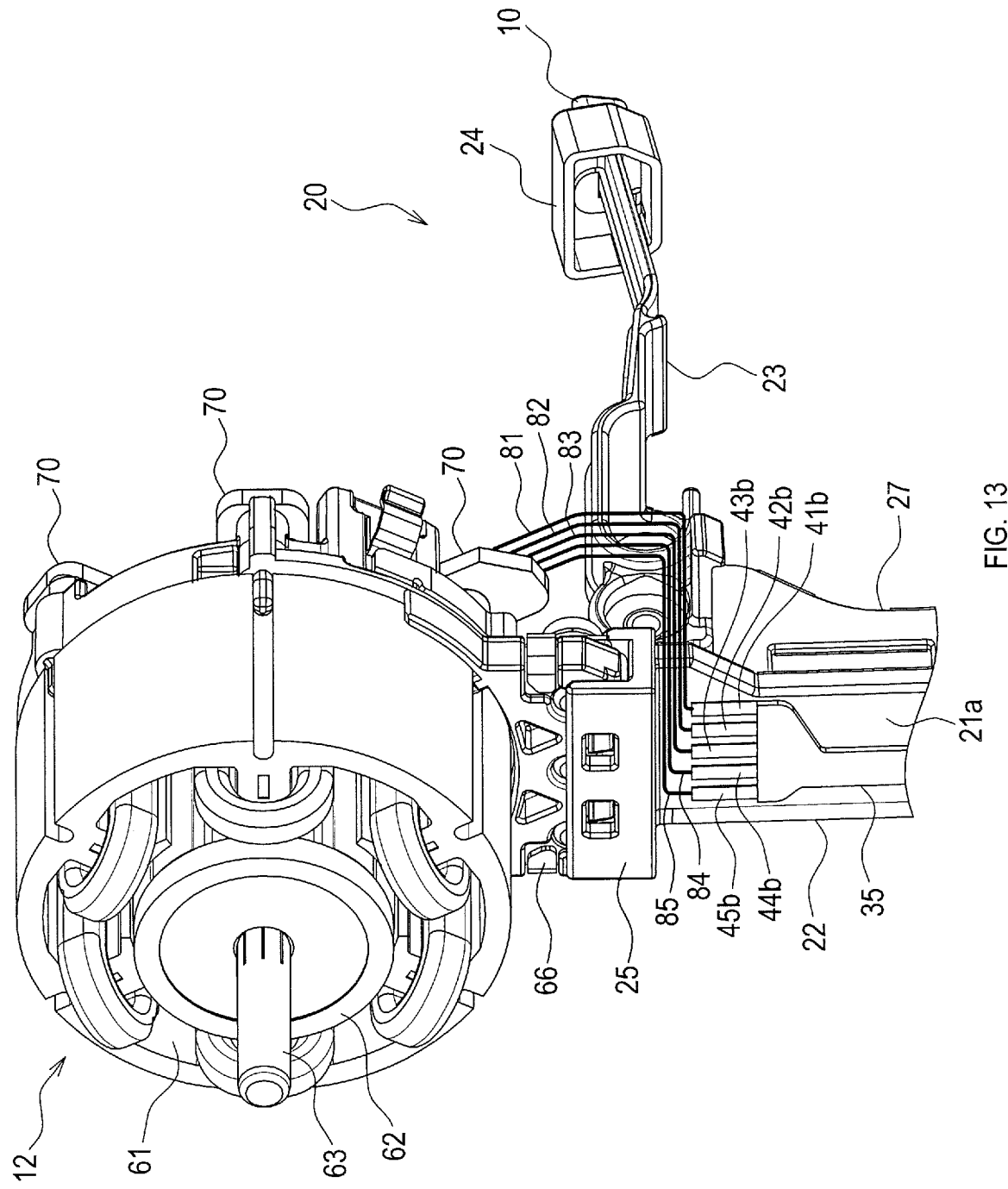
FIG. 13 is a fourth perspective view showing the motor, to which the resin wiring unit is coupled.

When the first Hall element 71, the second Hall element 72, and the third Hall element 73 are provided to the printed board 70 as shown in FIGS. 10 and 11, the resin wiring unit 20 and the wiring members 81 to 85 may be coupled together, for example, in a manner shown in FIG. 13. Specifically, each of the wiring members 81 to 85 may be coupled to corresponding one of the second terminals 41b, 42b, 43b, 44b, or 45b as shown in FIG. 13. The wiring members 81 to 85 each may be, for example, a lead wire. Further, the wiring members 81 to 85 each may include a wiring pattern that is formed on a resin-contained surface of each of the resin wiring unit 20 and the motor 12.

(5) Effects of the Present Embodiment

According to the present embodiment explained above, the following effects (a) to (g) are exhibited.

a) The electric working machine 1 of the present embodiment includes the resin wiring unit 20. The resin wiring unit 20 includes the frame 21 that is integrally molded with resin, the main current wiring portion 30 that is integrally provided to the frame 21 by the insert molding, and the wiring pattern 60 that is integrally formed on the surface of the frame 21.

In the electric working machine 1 configured as above, the main current wiring portion 30 and the wiring pattern 60 each are integrally provided to the mutual frame 21. Therefore, it is possible to dispose the main current wiring portion 30 and the wiring pattern 60 with ease and, at the same time, to properly maintain a positional relationship between the main current wiring portion 30 and the wiring pattern 60. As a result, it is possible to enhance working efficiency in laying an electric wiring in the electric working machine 1.

(b) In the resin wiring unit 20, the main current wiring portion 30 is insert-molded in the first frame 22, where a portion of the wiring pattern 60 is formed. This allows the first frame 22 to have an enhanced physical strength with an aid of the main current wiring portion 30 embedded into the first frame 22. As a result, it is possible to enhance reliability of the wiring pattern 60 that is formed on a surface of the first frame 22.

(c) The maximum value of each drive current flowing through the main current wiring portion 30 and supplied to the motor 12 is larger than the maximum value of each current flowing through the wiring pattern 60. In this way, the electric working machine 1 is configured such that relatively larger electric current flows through the main current wiring portion 30 and relatively smaller electric current flows through the wiring pattern 60. As a result, insulating performance of the main current wiring portion 30 and the wiring pattern 60 can be properly maintained.

(d) If the electric working machine 1 is configured to supply an electric current to the motor 12 through a conductor pattern formed on a surface of a resin-molded member, there may be a risk of difficulty in supplying an electric current that falls within a value of specified range (for example, a value equal to or more than a specified upper limit value) to the motor 12. In contrast, using the main current wiring portion 30, which is disposed by the insert molding, allows a large amount of electric current to be supplied to the motor 12. In other words, applying the insert molding in combination with the MID enables the large electric current and the small electric current, which are supplied to the motor 12 and to the LED 10 and the like respectively, to be supplied through the one same resin wiring unit 20.

(e) The electrode attaching portion 66 is inserted into the electrode receiver 25, thereby mechanically and electrically coupling the motor 12 and the resin wiring unit 20 together. As a result, the motor 12 and the resin wiring part 20 can be coupled together easily and certainly.

(f) A substantial portion of the wiring pattern 60 is covered with the insulation covering member 35 on the surface of the frame 21. And, the insulation covering member 35 is formed by the low temperature and pressure molding. As a result, it is possible to enhance the insulating performance of the wiring pattern 60 easily and efficiently.

(g) In the present embodiment, the resin wiring unit 20 is situated in an internal space in the grip 6 (the internal hollow 6a). As shown in FIGS. 1 and 2, the grip 6 is configured to be narrow so that the user of the electric working machine 1 can properly grip the grip 6. For this reason, the internal hollow 6a in the grip 6 is narrower than other internal spaces in the electric working machine 1 are. Using the resin wiring unit 20 to lay an electric wiring for such a narrow space allows an electric wiring to be laid efficiently even in a narrow space.

Here, the frame 21 corresponds to one example of the integrally-molded member of the present disclosure. The first conductor bar 31, the second conductor bar 32, and the third conductor bar 33 in the main current wiring portion 30 each correspond to one example of the second conductor of the present disclosure. The first Hall element conductor pattern 41 to the fifth Hall element conductor pattern 45, the first LED conductor pattern 51 and the second LED conductor pattern 52 in the wiring pattern 60 each correspond to one example of the first conductor of the present disclosure. The motor 12 corresponds to one example of the actuator of the present disclosure. The first Hall element 71, the second Hall element 72, and the third Hall element 73 each correspond to one example of the rotation position detector of the present disclosure. The first electrode 67, the second electrode 68, and the third electrode 69 in the motor 12 each correspond to one example of the input terminal of the present disclosure. The second terminals 31b, 32b, and 33b, respectively, in the first conductor bar 31, the second conductor bar 32, and the third conductor bar 33 each correspond to one example of the output terminal of the present disclosure. The insulation covering member 35 corresponds to one example of the low temperature and pressure molded member of the present disclosure. The grip 6 corresponds to one example of the handle of the present disclosure.

Other Embodiments

Although an embodiment of the present disclosure has been described above, the present disclosure is not limited to the above-described embodiment and may be modified in various forms.

(1) The frame 21 may contain any insulation material and may be molded by any molding method. For example, the frame 21 may be molded by a method that is different from the injection molding (for example, blow molding, extrusion molding, compression molding, low temperature and pressure molding and the like). If the insulation material contains resin, for example, the resin may be any resin. The insulation material may contain, for example, a thermosetting resin. The frame 21 may not contain resin, but may contain an insulation material other than resin or may contain the insulation material other than resin in addition to resin.

(2) The first conductor bar 31, the second conductor bar 32, and the third conductor bar 33 each may be embedded into the frame 21 in any portion of the first conductor bar 21, the second conductor bar 32, and the third conductor bar 3. For example, a portion exposed from the frame 21 may be different from the exposed portion of the above-described embodiment.

(3) Mutual distances between the first conductor bar 31, the second conductor bar 32, and the third conductor bar 33 may be equal or different. The first conductor bar 31, the second conductor bar 32, and the third conductor bar 33 may be placed in any relative positional relationship.

(4) The resin wiring unit 20 and the controller 14 may be electrically coupled together in any method. The resin wiring unit 20 and the motor 12 may be electrically coupled together in any method. For example, contrary to the above-described embodiment, a constituent element that corresponds to the electrode receiver 25 of the resin wiring unit 20 may be situated in the motor 12. And, the second terminals 31b, 32b, 33b in the main current wiring portion 30 may be inserted into the constituent element and screwed with respective screws so that the resin wiring unit 20 and the motor 12 are electrically coupled together.

(5) The resin wiring unit 20 may be fixed to the housing 3 in any manner. The resin wiring unit 20 may be fixed by, for example, a method that is different from the fixing method using the first screw 91 and the second screw 92 as described above.

(6) The motor 12 may be a motor other than the brushless motor. Further, the electric working machine 1 may operate with electric power that is different from the battery power. For example, the electric working machine 1 may include a motor that receives an alternating power of 100V for commercial use and is driven by the alternating power.

(7) The present disclosure can be applied to an electric working machine that includes an electric load different from a motor torque. For example, provided may be an electric working machine that includes any type of actuator, which is supplied with electric power through a main current wiring portion situated in a resin wiring unit. The actuator may be, for example, a solenoid of an electromagnetic valve.

Further, such an electric load of the present disclosure is not limited to the actuator. For example, provided may be an electric working machine that includes a heater for generating heat by energization, in which the heater is supplied with electric power through a main current wiring portion situated in a resin wiring unit.

(8) Two or more functions achieved by one element in the aforementioned embodiment may be achieved by two or more elements. A function achieved by one element may be achieved by two or more elements. Two or more functions achieved by two or more elements may be achieved by one element. One function achieved by two or more elements may be achieved by one element. A part of the configuration of the aforementioned embodiment may be omitted. An element of one of the aforementioned embodiments may be added to or replaced with another embodiment or other embodiments of the aforementioned embodiments.

What is claimed is:
1. An electric working machine, comprising:
a housing that includes a first storage, a second storage, and a handle, the handle being situated between the first storage and the second storage;
a trigger that is provided to the handle, the handle being configured to be operated by a user of the electric working machine;
a brushless motor that is situated in the first storage;
a first Hall element that is placed in the first storage, the first Hall element being configured to output a first rotation detection signal in accordance with a rotation position of the brushless motor;
a second Hall element that is placed in the first storage, the second Hall element being configure to output a second rotation detection signal in accordance with the rotation position of the brushless motor;
a third Hall element that is placed in the first storage, the third Hall element being configured to output a third rotation detection signal in accordance with the rotation position of the brushless motor;
a chuck sleeve that is provided to the first storage, the chuck sleeve being configured to attach a tool thereto and the chuck sleeve rotating with a rotational driving force of the brushless motor;
a controller that is situated in the second storage, the controller being configured to control the brushless motor in response to operation of the trigger;

a resin-molded member that is housed in the handle, the resin-molded member being disposed to extend from the second storage to the first storage, the resin-molded member including a surface, and the resin-molded member containing resin;

a first Hall element conductor pattern that is integrally provided to the surface of the resin-molded member, the first Hall element conductor pattern being configured to supply a Hall element drive current from the controller to the first Hall element, the second Hall element, and the third Hall element;

a second Hall element conductor pattern that is integrally provided to the surface of the resin-molded member, the second Hall element conductor pattern being configured to supply the Hall element drive current from the first Hall element, the second Hall element, and the third Hall element to the controller;

a third Hall element conductor pattern that is integrally provided to the surface of the resin-molded member, the third Hall element conductor pattern being configured to transmit the first rotation detection signal, which is output from the first Hall element, to the controller;

a fourth Hall element conductor pattern that is integrally provided to the surface of the resin-molded member, the fourth Hall element conductor pattern being configured to transmit the second rotation detection signal, which is output from the second Hall element, to the controller;

a fifth Hall element conductor pattern that is integrally provided to the surface of the resin-molded member, the fifth Hall element conductor being configured to transmit the third rotation detection signal, which is output from the third Hall element, to the controller; and a conductor bar that is integrally provided to the resin-molded member with a portion of the conductor bar being embedded into the resin-molded member, the conductor bar being configured to supply a motor drive current from the controller to the brushless motor.

2. An electric working machine, comprising:
an integrally-molded member that includes a surface and contains an insulation material;
a first conductor that is integrally provided to the surface of the integrally-molded member, the first conductor being configured to supply a first current; and
a second conductor that is integrally provided to the integrally-molded member with a portion of the second conductor being embedded into the integrally-molded member, the second conductor being configured to supply a second current.

3. The electric working machine according to claim 2, wherein the insulation material contains resin.

4. The electric working machine according to claim 2, wherein the second conductor includes:
an elongated portion that includes a first end and a second end;
a first terminal that is situated in the first end; and
a second terminal that is situated in the second end,
wherein the first terminal and the second terminal are exposed outside the integrally-molded member, and
wherein a portion of the elongated portion is embedded into the integrally-molded member.

5. The electric working machine according to claim 2, wherein the second current has a maximum value that is larger than a maximum value of the first current.

6. The electric working machine according to claim 2, further comprising:
an actuator that is electrically coupled to the second conductor, the actuator being configured to be driven by the second current supplied from the second conductor.

7. The electric working machine according to claim 6, wherein the actuator includes a motor.

8. The electric working machine according to claim 7, wherein the motor is a brushless motor.

9. The electric working machine according to claim 7, further comprising:
a rotation position detector that is configured to output a signal in accordance with a rotation position of the motor,
wherein the first conductor is electrically coupled to the rotation position detector, and
wherein the first conductor is configured to supply the first current from the first conductor to the rotation position detector.

10. The electric working machine according to claim 7, further comprising:
a rotation position detector that is configured to output a signal in accordance with a rotation position of the motor,
wherein the first conductor is electrically coupled to the rotation position detector, and
wherein the first conductor is configured to supply the first current from the rotation position detector to the first conductor, the first current corresponding to the signal.

11. The electric working machine according to claim 6, wherein the actuator includes an input terminal that is configured to be supplied with the second current,
wherein the second conductor includes an output terminal that is configured to output the second current, and
wherein the output terminal is in contact with the input terminal.

12. The electric working machine according to claim 2, further comprising:
a light emitting diode (LED) that is configured to be driven by the first current,
wherein the first conductor is electrically coupled to the LED, and
wherein the first conductor is configured to supply the first current from the first conductor to the LED.

13. The electric working machine according to claim 2, further comprising:
a low temperature and pressure molded member that is provided to the surface of the integrally molded member, the low temperature and pressure molded member being formed to cover at least a portion of the first conductor and the low temperature and pressure molded member containing an insulation material.

14. The electric working machine according to claim 2, further comprising:
a handle that is configured to be gripped by a user of the electric working machine,
wherein the handle includes an internal hollow, and
wherein the integrally-molded member is situated in the internal hollow.

15. The electric working machine according to claim 2, wherein the actuator includes a motor,
wherein the electric working machine further includes a rotation direction selector that is configured to be operated by a user of the electric working machine and in which a rotation direction of the motor is selected in response to operation of the rotation direction selector, wherein the integrally-molded member includes a selector insertion hole, into which the rotation direction selector is inserted, and wherein the rotation direction selector is configured to move through the selector insertion hole in response to the operation of the rotation direction selector by the user.

16. The electric working machine according to claim 2, wherein the integrally-molded member includes:
- a first frame that is formed into a plate shape and includes a plate surface, and
- a second frame that extends from the plate surface so as to intersect the plate surface.

17. The electric working machine according to claim 16, wherein the first frame includes a first surface, wherein the second frame includes a second surface, wherein the first conductor is provided to the first surface and the second surface, and wherein the second conductor is not provided to the second frame, but is provided to the first frame.

18. A method of assembling an electric working machine, comprising:
- placing an actuator within a housing of the electric working machine;
- placing a controller within the housing, the controller being configured to control the actuator; and
- placing an integrally-molded member within the housing, the integrally-molded member being separated from the controller, the integrally-molded member containing an insulation material, the integrally-molded member including a surface, the integrally-molded member being provided with a first conductor and a second conductor, the first conductor being integrally provided to the surface of the integrally molded member, the first conductor being configured to supply a first current, the second conductor being integrally provided to the integrally-molded member, a portion of the second conductor being embedded into the integrally-molded member, and the second conductor being configured to supply a second current.

* * * * *